Jan. 30, 1934.   L. B. GREEN   1,945,036
AUTOMATIC CONTROL FOR SHOCK ABSORBERS
Filed May 20, 1932   2 Sheets-Sheet 1
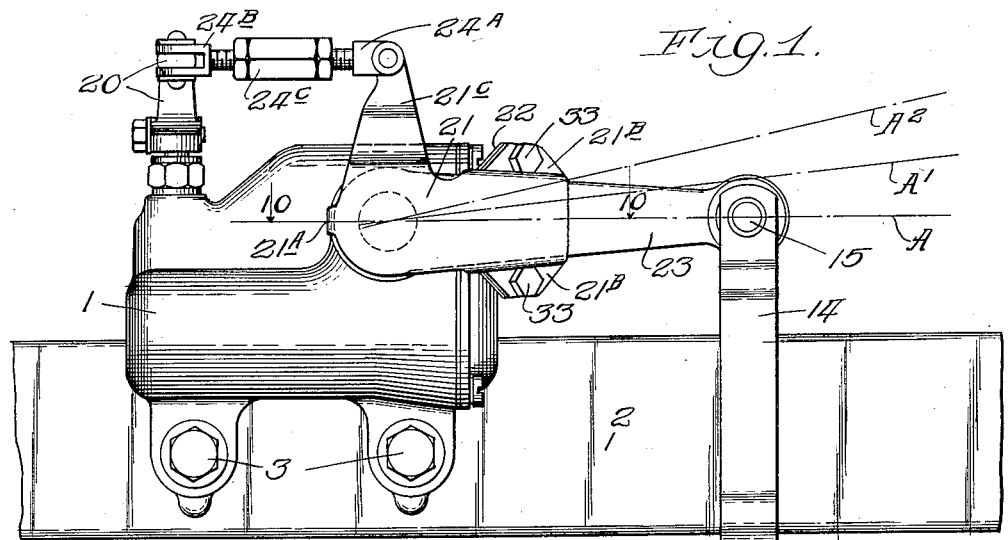
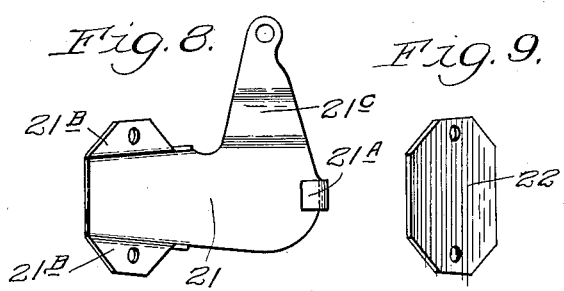
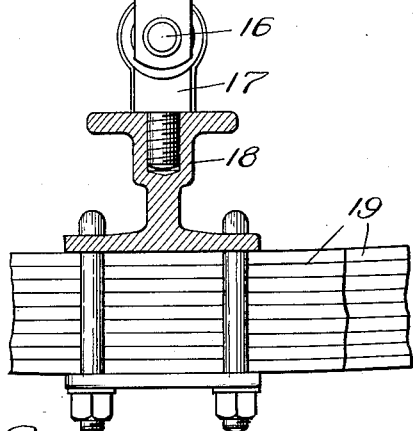
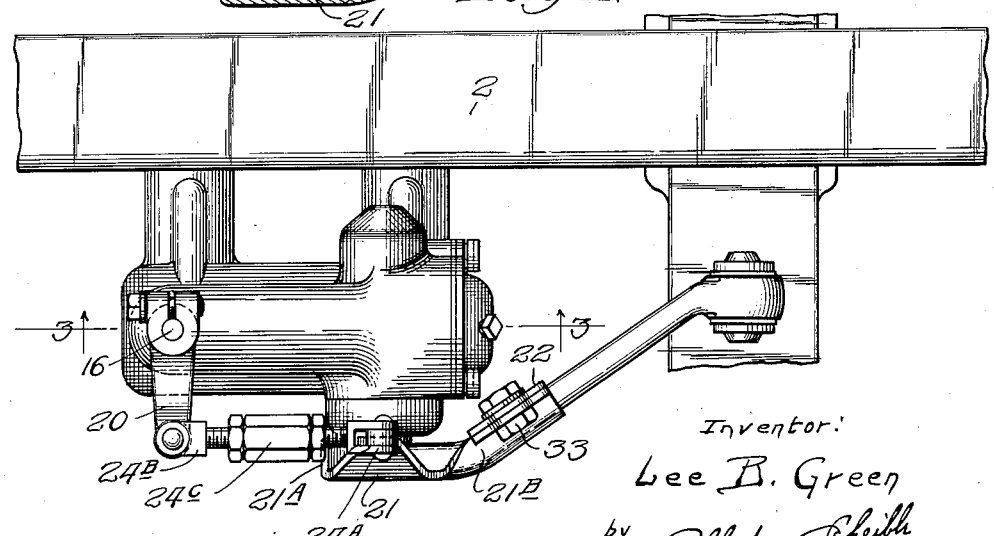
Inventor:
Lee B. Green
by Albert Scheibl
Attorney Jan. 30, 1934.  L. B. GREEN  1,945,036
AUTOMATIC CONTROL FOR SHOCK ABSORBERS
Filed May 20, 1932  2 Sheets-Sheet 2
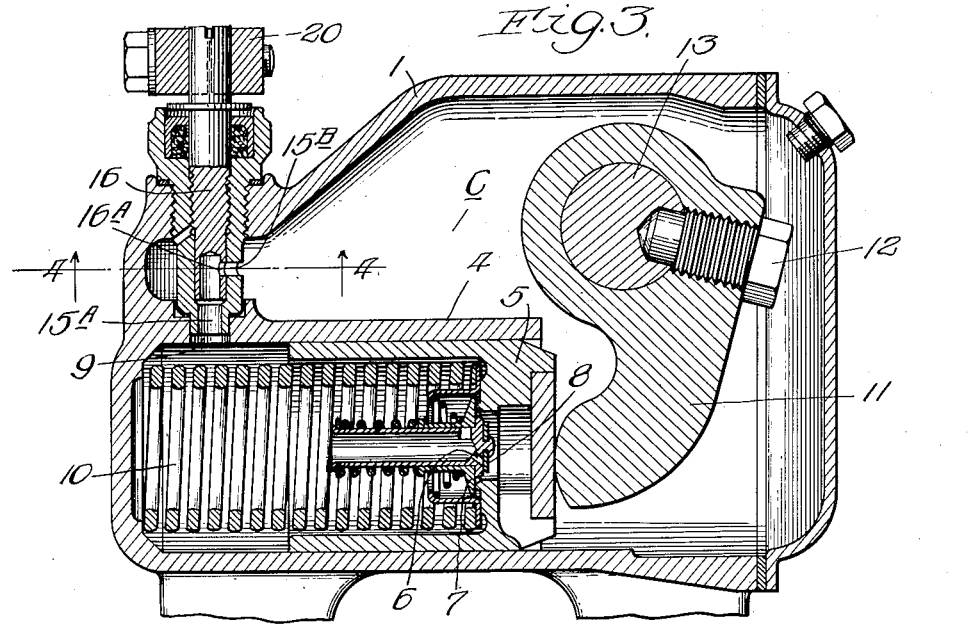
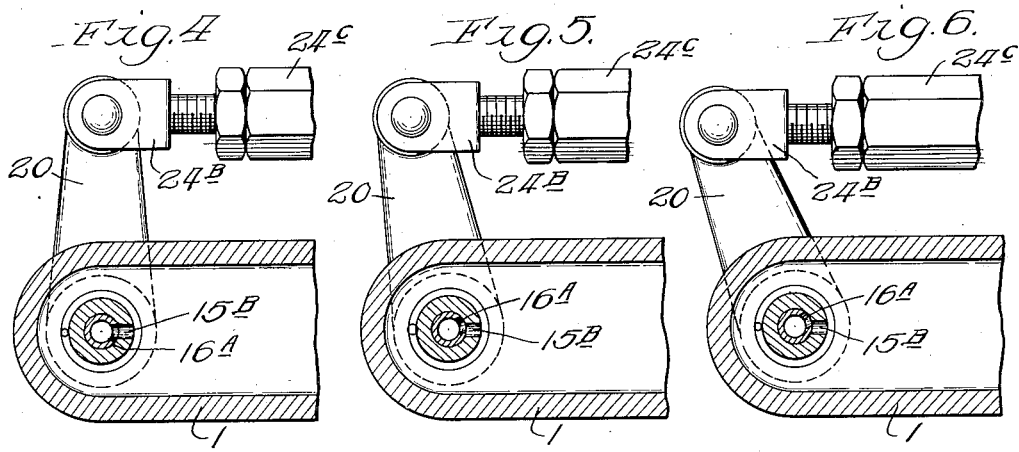
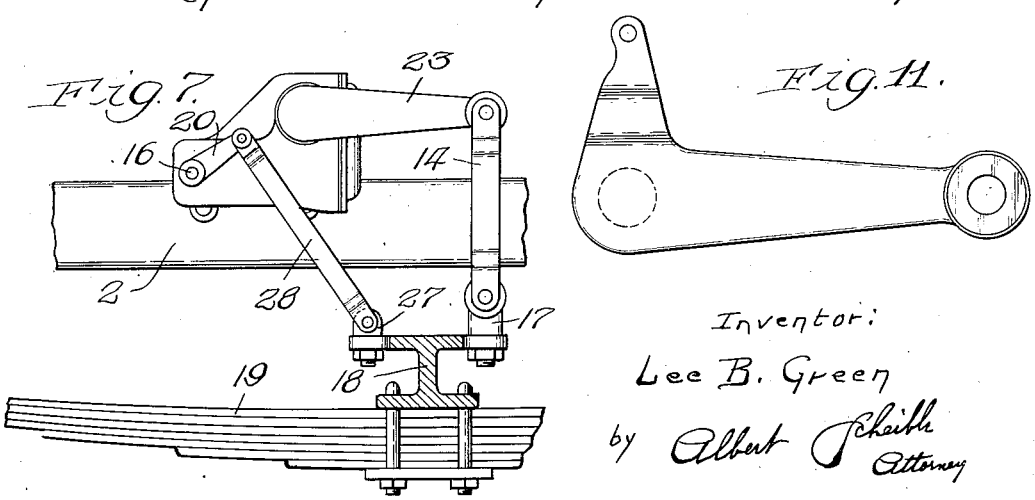
Inventor:
Lee B. Green
by Albert Scheible
Attorney Patented Jan. 30, 1934

1,945,036

UNITED STATES PATENT OFFICE 1,945,036

AUTOMATIC CONTROL FOR SHOCK ABSORBERS

Lee B. Green, Lakewood, Ohio, assignor to The Globe Machine & Stamping Company, Cleveland, Ohio, a corporation of Ohio Application May 20, 1932. Serial No. 612,530

4 Claims. (Cl. 188—88)

My invention relates to hydraulic shock absorbers for retarding the relative movement of one member in one direction with respect to another member by causing this movement to force liquid out of a cylinder or other compartment which is connected to a liquid-storing chamber by two ports, one of these ports being controlled by a valve which can be adjusted in proportion to variations in the spacing between the two relatively movable members when both of these members are stationary. Generally speaking, the objects of my invention are those of providing simple, inexpensive and entirely automatic means for making the proper adjustment of such a control valve in proportion to the momentum with which one member moves toward the other to force the liquid out of the cylinder.

More particularly, my invention relates to hydraulic shock absorbers of the above recited general class in which the said compartment and liquid-storing chamber are parts of a unitary structure fastened to one of the two relatively movable members, and in which the forcing of the liquid out of the said compartment is effected by a mechanism which includes a portion movably mounted on the said unitary structure and connected to the other of the said members. In this aspect, my invention aims to provide means connecting the said movable portion with the control valve for automatically adjusting the position of that valve according to the spacing of one of the said members from the other when both members are stationary.

Illustrative of the manner in which I accomplish these objects, and also of further and more detailed objects of my invention, Fig. 1 is a side elevation of an automatically adjusted hydraulic shock absorber embodying my invention as used on a vehicle, including relatively movable axle and chassis parts of the vehicle, and also including portions of two springs fastened to the axle for yieldingly supporting the chassis.

Fig. 2 is a plan view of the same parts.

Fig. 3 is an enlarged vertical and longitudinal section through the main unit of the same shock absorber, taken along the line 3—3 of Fig. 2.

Fig. 4 is a fragmentary horizontal section taken along the line 4—4 of Fig. 3 and looking upwards, showing the position of the control valve with respect to the port controlled by it when the chassis is stationary with respect to the axle and when the chassis carries a light normal load, and also showing the corresponding position of a lever fastened to this valve and of part of a link leading to this lever.

Figs. 5 and 6 are views similar to Fig. 4, showing the positions of the same parts when the load on the chassis is respectively heavy and extra heavy.

Fig. 7 is an elevation allied to that of Fig. 1 but drawn on a reduced scale, showing an alternative arrangement of the operating connections between the valve lever and the axle of the lever.

Fig. 8 is a rear elevation of the supplemental lever attachment to a non-automatically controlled hydraulic shock absorber, drawn on the same scale as Fig. 1.

Fig. 9 is an elevation of the clamp plate used in attaching this supplemental lever.

Fig. 10 is a fragmentary horizontal section along the line 10—10 of Fig. 1.

Fig. 11 is an elevation of a single-piece lever adapted to be used in substitution for the multipart lever of Fig. 1.

In the embodiment of Figs. 1 to 10, the main unit of the shock absorber includes a casing 1 fastened to the chassis 2 by bolts 3, which casing has within it a partition affording a cylinder 4 open at one end to the interior of the casing. Slidable in this cylinder is the piston 5 of a piston member which is constructed to afford a port 6 connecting the interior of the cylinder with the liquid storing chamber C constituted by the major portion of the interor of the casing. This port 6 is here shown as formed in a secondary piston 7 supported by the main piston 5 and closed at times by a flexible flap 8, but the manner in which the piston and cylinder arrangement affords a port through or otherwise past the piston is immaterial to my invention.

The bore of the cylinder is also connected to the liquid-storing chamber C by an auxiliary port 9 disposed beyond the range of the inward travel of the piston 5, and my invention relates to an automatic control of the flow of liquid from the cylinder through this auxiliary port. A compression spring 10 interposed between the piston and a stationary part of the casing 1 continually presses the piston against a cam 11 disposed within the casing and fastened by a screw 12 to a cam shaft 13 which extends through a side wall of the casing.

Fast upon the outer end of the cam shaft and extending radially of this shaft is an arm 23 which has its outer end pivotally connected to a rigid and approximately upright link 14 by a horizontal pivoting pin 15. The lower end of this link is pivotally connected by a second pin 16, parallel to the upper pin 15, to an eye 17 fastened to the vehicle axle 18, and chassis-supporting springs 19 are interposed in the usual manner between this axle and the chassis 2.

Thus arranged, a downward movement of the chassis 2 with respect to the axle 18 will cause the link 14 to raise the cam arm 23, thereby rotating the cam 11 in a counter-clockwise direction in Figs. 1 and 3, so that the spring 10 will move the piston farther away from the port 9, thereby drawing oil or other liquid from the chamber C through this port into the cylinder. Likewise, the upward movement of the chassis with respect to the axle will move the same parts in the opposite direction, so that the piston will force liquid from the cylinder back into the liquid-storing chamber or reservoir C through the port 6, and also through the auxiliary port 9.

In automobile practice it has long been customary to provide a valve for controlling the rate at which liquid will flow from the cylinder into the liquid-storing chamber C through such an auxiliary port 9, as for example by having this port lead to the bore 15A of a stationary valve body 15 which has a lateral outlet 15B leading from that bore to the said chamber, and by rotatably mounting within this bore 15A a valve member 16 having an L-shaped passage disposed so that one end of that passage can be moved into and out of alinement with the said outlet 15B by rotating the valve member with respect to the valve body.

Where such a movable valve member is disposed between the liquid-storing chamber and the auxiliary outlet port of the cylinder, it has also become customary to some extent in automobile practice to facilitate an adjusting of the position of this valve member by connecting that member to a control rod extending through the dash of the car, so that the driver can manually adjust the position of this valve member.

However, a considerable proportion of car drivers are not sufficiently expert to judge the position to which such a control rod should be adjusted for a given weight of load, or even to estimate that weight; and the driver also may forget to change the adjustment when the load is varied, so that the wrong adjustments due to any of these causes reduce the intended cushioning effect of the shock absorber.

My present invention aims to obviate the just recited objections to the manual controlling of a valve associated with the auxiliary outlet port of the usual cylinder in a hydraulic shock absorber of the above described general type, and likewise aims to overcome the even greater objections which are encountered if the movable valve member is arranged so that the user must make the needed adjustment directly at the shock absorber.

To accomplish this purpose with a rotatable control valve 16, as in Fig. 3, I preferably fasten to this valve exteriorly of the casing 1 an arm 20 extending radially of the valve (as in Fig. 2), and connect this arm 20 operatively to the cam shaft 13 so that rotational movements of the cam shaft will also be transmitted to the control valve.

When the selected shock absorber already has both a cam arm 23 and such a valve arm 20, as here shown, the user merely needs to detach the usual dash-control rod from the said valve arm and to substitute for it a link leading to an extra cam arm 21 which is clamped to the usual cam arm 23 as shown in Figs. 1 and 2. As further shown in Figs. 8 and 10, this auxiliary cam arm 21 comprises a sheet metal punching including a hook 21A engaging the inner end of the cam arm and having a channel-sectioned portion presenting flanges 21B at opposite edges of the cam arm 21, together with a clamp piece 22 (Fig. 9) engaging the inward face of the cam arm and fastened to the auxiliary cam arm by bolts 33.

This attached punching also includes an arm 21C extending at an angle to the axis of the channel-sectional main portion which extends along the cam arm 23, thereby cooperating with the cam arm 23 to form a bell-crank lever presenting an arm 21C auxiliary to the said cam arm. Connecting this auxiliary arm 21C with the valve arm 20 is a link, preferably consisting of two end portions 24A and 24B connected by a turnbuckle 24C by which the effective length of this link can be adjusted to vary the position of the outlet 16A of the movable control valve member 16 with respect to the reservoir inlet 15B (in Fig. 3) when the chassis and the axles are both stationary.

With this link adjusted for a light load of the car, so that the outlet 16A of the auxiliary valve alines with the reservoir inlet 15B, and with the said inlet and outlet both of the same diameter, it will be obvious from Fig. 4 that the connection of the cylinder to the liquid chamber through the auxiliary valve is fully opened in the static condition of the chassis, namely when the chassis is not bouncing. Thus adjusted, the mechanism will begin to shut off the flow through the auxiliary valve just as soon as the chassis begins to lift and hence will respond speedily to any bouncing.

However, if the load on the chassis is increased so that in a static condition the chassis is nearer to the axle, the depressing of the chassis will cause the link 14 (Fig. 1) to shift the axis of the cam lever from the former position A to a position such as A¹, and the connections between the cam lever and the auxiliary valve will rotate the auxiliary valve to the position of Fig. 5, in which a longer arcuate movement of the valve in a clockwise direction will be required during the rebound of the chassis.

Likewise, if the load on the chassis is increased still further, so that the cam lever has its axis at A² in Fig. 1 when the car is at rest, the auxiliary valve will then be positioned as in Fig. 6, thereby requiring a still greater movement before it shuts off the connection from the cylinder to the liquid chamber through the auxiliary valve.

Thus my shock absorber automatically adjusts its auxiliary valve control whenever the weight on the chassis changes, as for example when added passengers enter or leave, or when the load is increased by heavy luggage, so that no attention whatever is required on the part of the driver of the car.

However, while I have particularly described an embodiment of my invention in which the auxiliary control valve is moved by a mechanism including an auxiliary lever arm attached to the already present cam lever of a commercial type of shock absorber which is marketed without any automatic control of that valve, I do not wish to be limited in this respect. With the previously described general construction, the bell-crank lever of which the attachable arm 21 forms a part might obviously be integral, as shown in Fig. 11.

Furthermore, since the automatic adjustment of the auxiliary control valve is in response to variations in the spacing of two relatively movable members (which in the case of a vehicle usually are the chassis and an axle underhanging the chassis), an independent connection between one of these members and the auxiliary control valve of a shock absorber mounted on the other member may also be employed according to my invention.

For example, Fig. 7 shows a separate link 28 interposed betwen the valve-actuating arm 20 and an eye 27 fast on the axle 27, independent of the usual connecting of the axle to the cam lever 13 by a link 14, the axis of the auxiliary valve 16 in this case being horizontal. With this embodiment, variations in the spacing between the axle and the chassis obviously will actuate both the cam lever and the auxiliary control valve conjointly, but through independent connecting means. Fig. 7 also shows the use of a link 28 of non-adjustable length for moving the control valve member through the arm 20 on that member. This is adequate when my shock absorber is to be used only on vehicles of a given normal chassis weight, for which reason a non-adjustable link might likewise be used instead of the multipart link of Fig. 1 (which consists of the parts 24A, 24B and 24C) when my shock absorber is constructed for use as standard equipment on any automobile of a given type, make and year.

So also, I do not wish to be limited to details of the construction and arrangement here disclosed, since many changes might be made without departing either from the spirit of my invention or from the appended claims. Nor do I wish to be limited to the use of my automatically controlled hydraulic shock absorber on vehicles, since it obviously would function with equal effectiveness when interposed between other relatively movable members which vary at times in their normal spacing.

I claim as my invention:

1. A shock absorber for a vehicle having a chassis movable with respect to a wheel axle and having a compression spring interposed between the axle and the chassis, comprising: a liquid-containing casing and cylinder assemblage fast on the chassis; a piston movable in the cylinder and provided with a port, the cylinder having an auxiliary port and both of the ports opening into the interior of the casing; operating means interposed between the piston and the axle for moving the piston toward the auxiliary port when the chassis moves downward with respect to the axle, the said means including a bell-crank lever having one arm thereof associated with the piston; a movable valve member controlling the auxiliary port; and auxiliary means connecting the lever with the valve member for modifying the position of the valve member when the chassis and axle are relatively stationary, according to the extent to which the spring is depressed by the chassis and the load on the chassis, the auxiliary means including a second lever fast with respect to the aforesaid lever and having its pivot axis coaxial with that of the aforesaid lever, and a link connecting the second lever with the said valve member.

2. A shock absorber for operative interposition between the chassis of a vehicle and an axle underhanging the chassis, comprising a liquid-storing casing and a cylinder both fast on the chassis, a piston member movable in the cylinder, one of the said members being provided with a port connecting the interior of the cylinder with the interior of the said casing, the cylinder also having an auxiliary port leading from its interior into the casing; mechanism interposed between the piston member and the axle for causing a downward movement of the chassis with respect to the axle to expel liquid out of the cylinder through both of the said ports; a shut-off valve controlling the flow of liquid through the auxiliary port; valve operating means interposed between the valve and the axle for moving the valve toward its shut-off position in timed relation to the liquid-expelling operation of the piston by the said mechanism, the said means including two connecting members and a rigid connection between the connecting members, the said connection being disposed exteriorly of the said casing and cylinder and adjustable to vary the position of the auxiliary valve when the chassis and axle are relatively stationary.

3. A shock absorber for operative interposition between the chassis of a vehicle and an axle underhanging the axle, comprising a liquid-storing casing and a cylinder both fast on the chassis, a piston member movable in the cylinder, one of the said members being provided with a port connecting the interior of the cylinder with the interior of the said casing, the cylinder also having an auxiliary port leading from its interior into the casing; mechanism including a rock-shaft, means interposed between the rock-shaft and the piston whereby rotation of the said shaft in one direction moves the piston to cause the latter to expel liquid from the cylinder through both ports; an arm fast on the rock-shaft, a link connecting the said arm with the axle, a shut-off valve controlling the flow of liquid through the auxiliary port; an auxiliary arm attached to the aforesaid arm, both arms extending radially of the rock-shaft, and means operatively connecting the auxiliary arm with the said valve whereby rotational movement of the rock-shaft also moves the shut-off valve.

4. A shock absorber for a vehicle having a chassis movable with respect to a wheel axle and having a compression spring interposed between the axle and the chassis, comprising: a liquid-containing casing and cylinder assemblage fast on the chassis; a piston movable in the cylinder and provided with a port, the cylinder having an auxiliary port and both of the ports opening into the interior of the casing; operating means interposed between the piston and the axle for moving the piston toward the auxiliary port when the chassis moves downward with respect to the axle, the said means including a bell-crank lever having one arm thereof associated with the piston; a movable valve member controlling the auxiliary port and having a part thereof extending outwardly through the casing; and connecting means exterior of the casing and operatively interposed between the lever and the said part of the valve member, the connecting means being adjustable for varying the position of the valve member when the chassis and axle are relatively stationary; the said connecting means affording a non-yielding mechanical connection between the lever and the valve member, whereby the connecting means cause the valve member to move in direct and sole response to movements of the lever regardless of the pressure of liquid in the cylinder.

LEE B. GREEN.